US012763981B2

(12) United States Patent
Kahn

(10) Patent No.: US 12,763,981 B2
(45) Date of Patent: Oct. 13, 2026

(54) DYNAMIC CASCADING SIGNATURE CHAIN

(71) Applicant: Jonathan Kahn, New Fairfield, CT (US)

(72) Inventor: Jonathan Kahn, New Fairfield, CT (US)

( * ) Notice: Subject to any disclaimer, the term of this patent is extended or adjusted under 35 U.S.C. 154(b) by 0 days.

(21) Appl. No.: 19/530,839

(22) Filed: Feb. 5, 2026

(65) Prior Publication Data

US 2026/0230339 A1 Aug. 6, 2026

Related U.S. Application Data

(60) Provisional application No. 63/754,469, filed on Feb. 5, 2025.

(51) Int. Cl.
*H04L 9/00* (2022.01)

(52) U.S. Cl.
CPC .................................... *H04L 9/50* (2022.05)

(58) Field of Classification Search
CPC .................................................. H04L 9/50
See application file for complete search history.

(56) References Cited

U.S. PATENT DOCUMENTS

| | | | | |
|---|---|---|---|---|
| 11,349,670 | B1 | 5/2022 | Miller | |
| 11,810,103 | B2 * | 11/2023 | Bennett | H04L 9/50 |
| 2009/0328218 | A1 | 12/2009 | Tsurukawa | |
| 2020/0034540 | A1 | 1/2020 | Husson et al. | |
| 2020/0128043 | A1 * | 4/2020 | Xie | H04L 9/50 |
| 2020/0128044 | A1 * | 4/2020 | Xie | H04L 63/1466 |
| 2020/0296130 | A1 * | 9/2020 | Xie | H04L 63/1416 |
| 2020/0304326 | A1 * | 9/2020 | Xie | G06F 21/554 |
| 2022/0286273 | A1 * | 9/2022 | Snow | H04L 9/3236 |
| 2022/0318122 | A1 * | 10/2022 | Hughes | H04L 9/0643 |
| 2023/0097738 | A1 * | 3/2023 | Li | H04L 9/50 713/176 |
| 2023/0401340 | A1 * | 12/2023 | Nobel | G06F 21/72 |
| 2023/0403144 | A1 * | 12/2023 | Rhodin | H04L 9/50 |
| 2024/0015028 | A1 * | 1/2024 | Wang | H04L 9/50 |
| 2024/0097911 | A1 * | 3/2024 | Chan | H04L 9/50 |
| 2024/0388429 | A1 * | 11/2024 | van Vredendaal | H04L 9/50 |

FOREIGN PATENT DOCUMENTS

| | | | | |
|---|---|---|---|---|
| CN | 116488804 | A * | 7/2023 | H04L 9/0838 |
| CN | 116739592 | A * | 9/2023 | G06Q 20/3825 |
| CN | 119172054 | A * | 12/2024 | H04L 9/50 |

* cited by examiner

*Primary Examiner* — Richard G Keehn
(74) *Attorney, Agent, or Firm* — Ziegler IP Law Group, LLC.

(57) ABSTRACT

A method of providing a dynamic cascading signature chain for at least one process in a streaming system includes generating an initial signature by generating random parameters, generating a random factor, and applying a hashing function to the random parameters and the random factor, validating the initial signature by applying the hashing function to the random parameters and the random factor, comparing the resulting signature to the initial signature and when the resulting signature and the initial signature match, generating at least one ongoing signature by generating parameters specific to the at least one process, generating a unique factor, and applying the hashing function to the validated initial signature, the process specific parameters, the unique factor and data associated with the at least one process, and validating the at least one ongoing signature.

20 Claims, 8 Drawing Sheets

DYNAMIC CASCADING SIGNATURE CHAIN

This application claims the benefit of U.S. Provisional Application No. 63/754,469, filed 5 Feb. 2025, incorporated by reference in its entirety.

FIELD

The disclosed embodiments relate to the field of data security, particularly to the ongoing authentication and verification of both data and its source within real-time high bandwidth streaming data systems.

BACKGROUND

Known security systems and methods for verifying data and authenticating its source in real-time data systems process source authentication and data validation functions separately. These known security systems and methods often rely on centralized architectures, cryptographic algorithms, static methods, and immutable processes where source authentication and data validation are treated as distinct processes. However, source and data are often related, requiring more efficient and adaptive processing, resulting in known security systems and methods being inadequate, particularly in real-time data systems.

Ensuring ongoing security as data constantly moves through these real-time data systems while maintaining speed and reliability can be critical for real-time data system applications such as in low-level operations (e.g. process memory, and inter-process messaging), embedded devices, event driven architectures, distributed systems, data processing pipelines, and other related use cases. Known security systems and methods are generally incompatible with the design of dynamic real-time data system applications, and when applied can form security and performance gaps unsuitable for the requirements of real-time data systems.

For example, in network applications, this disadvantageous performance gap stems from a mismatch between standard request-reply architecture, which depends on a discrete exchange of data, combined with a continuous flow of data, which are conflicting models, thus resulting in debilitated performance and fragmented security.

Network security architectures are generally centralized such as in key-based, token-based, and certificate-based systems where secrets are stored on a server, database, or in code, which require separate requests to authenticate or validate each step in a process and when applied to a dynamic system can introduce latency, bottlenecks, additional complexity, dependencies, and increased risk.

Of importance, the reliance on static or shared secrets in the traditional security methods can also be considered a security liability, wherein these methods could be bypassed through reverse engineering, or secrets can be potentially compromised through infiltration potentially compromising overall system security.

A major flaw in known dynamic or high-frequency environments like real-time data systems is that once a static secret is obtained, attackers can exploit it repeatedly without detection, where gaps in authentication can be difficult to trace or mitigate. Moreover, static secrets increase vulnerability to replay attacks, side-channel attacks, and tampering, as there is no mechanism to continually validate and evolve the authentication.

Many of these known systems and methods are also based on encryption which contribute to additional overhead and complexity, all of which are adverse to streaming system requirements that demand seamless, uninterrupted flow of data.

In known data security systems, "hashing" is used. Hashing data is a mathematical process that converts data (like a file, message, or password) into a unique, fixed-length string of characters; referred to as a "hash," which acts as a fingerprint of the original data, ensuring its integrity and making it difficult to reverse-engineer the original data itself, especially when used for sensitive information like passwords and the like. Hashing is basically a one-way encryption method used to verify data authenticity without revealing the actual data itself.

Also in known data security systems, a "salt" may be used. A "salt" is a randomly generated string of characters added to a password or other sensitive data before the data is hashed, making it significantly harder for attackers to crack the password by preventing them from using pre-computed tables to reverse the hash, thus enhancing security by adding an extra layer of complexity to the hashing process.

These known and disadvantageous issues can be particularly relevant in embedded systems, such as used with microcontrollers, industrial sensors, and IoT devices, which often operate with strict and limited resources such as memory, processing power, and network access, and in which reliance on extra performance requirements and continuous network connection may not always be acceptable.

Additionally, these systems may be even more susceptible to attack due to their physical nature where static security may be more easily compromised.

Side-channel attacks pose an additional security risk to embedded systems through the exploitation of observable characteristics, such as power consumption, electromagnetic emissions, or timing patterns, to deduce static secret information, such as encryption keys.

Another alternative to the traditional security method is Blockchain. The main purpose of Blockchain is the immutable storage of transactions and is not directly concerned with how data enters the Blockchain system or the integrity of the data entering the Blockchain system, however despite its intended design and purpose, Blockchain implementations have become increasingly common as an alternative to traditional security methods.

Blockchain is considered decentralized security, but while secrets are distributed in Blockchain, Blockchain is still centralized in architecture, relying on a central point of consensus for verification, amplifying the complexity and dependency issues found in traditional methods, as more infrastructure is usually required for implementation of Blockchain, which in some scenarios, the cost of this extra complexity may have the benefit of greater security, however in real-time data systems, Blockchain may be even less efficient than traditional methods.

Further, Blockchain, like traditional security methods, is also based on encryption, adding overhead and complexity. It is also immutable, and if there is a need for any change in data, the Blockchain must "rebuild", which is also a separate process.

While known traditional security systems and methods including Blockchain are currently used in real-time data systems, such are not suitable or designed for efficiently authenticating and verifying data and the data's source in real-time and streaming data systems.

Known traditional security systems and methods introduce significant disadvantages; such as latency, security gaps, and security risks, while Blockchain, although implemented as an alternative to traditional security systems and methods, also has incompatible design and function for use with and in real-time data systems, including complexity of a centralized verification; but requires the use of more infrastructure for implementation and is resistant to any changes due to overall Blockchain immutable design and function.

SUMMARY

A dynamic cascading signature chain inherently counters these threats by eliminating static or reusable secrets in favor of dynamically generated signatures, making each interaction unique. By continuously validating each step in real time, the disclosed dynamic cascading signature chain prevents the formation of detectable patterns and removes static points of vulnerability that traditional side-channel attacks would exploit. This design provides an effective defense for embedded systems where side-channel attacks are a common threat.

The presently disclosed embodiments substantially depart from known security system and method designs, and provide security designed for the purpose of increasing the efficiency, security, and adaptability of continuous authentication and verification of both data and the data's source in real-time data systems.

The disclosed embodiments are directed to a method of providing a dynamic cascading signature chain for at least one process in a streaming system includes generating an initial signature by generating random parameters, generating a random factor, and applying a hashing function to the random parameters and the random factor, validating the initial signature by applying the hashing function to the random parameters and the random factor, comparing the resulting signature to the initial signature and when the resulting signature and the initial signature match, generating at least one ongoing signature by generating parameters specific to the at least one process, generating a unique factor, and applying the hashing function to the validated initial signature, the process specific parameters, the unique factor and data associated with the at least one process, and validating the at least one ongoing signature.

The disclosed embodiments overcome known data security limitations and risks by eliminating reliance on static secrets and by providing a continuously updated chain of signatures based on a constantly changing factor, inherently resistant to reverse engineering and tampering due to its unique and dynamic nature.

In view of disadvantages inherent in known security systems and methods used in real-time data systems, the disclosed embodiments provide an adaptive dynamic security algorithm designed to continuously authenticate and verify both data and the data's source in and for real-time data systems.

An object of the disclosed embodiments is to provide a novel and useful security system and method for real-time data systems which maintains many of the advantages of known security systems and methods and mitigating the known disadvantages.

An object of the disclosed embodiments is to provide a security system and method including an evolving or dynamic signature chain derived from and with a constantly changing factor where each signature is composed of the signature from a previous step or process, at least one other verifiable parameter, and at least one factor that changes at each step, forming and providing a traceable dynamic chain of signatures which requires and ensures continual authentication and data integrity throughout the system; thus providing real-time tamper resistance and immediate detection of unauthorized attempted entry and/or data modification.

The disclosed embodiments produce elements in the dynamic cascading signature chain that are always unique regardless of any duplication of data; and becomes stronger at each element in the chain as a new random layer is added at each iteration of the factor.

In addition to the disclosed embodiments' suitability for use in real-time high bandwidth data systems, the embodiments disclosed herein are also applicable and useful in ordered workflows where the sequential integrity of machines, devices, or processes is critical.

By linking each system with a unique, dynamically generated signature chain, the disclosed embodiments provide a dual-layer approach to data security by securing both the systems that serve the data and the data itself; providing tamper resistance, continuous verification, and secure traceability at each element in the chain.

The versatility of the disclosed embodiments to adapt to diverse environments from dynamic real-time high bandwidth data streams, to fixed, ordered data processing pipelines; ensures that both the origin and integrity of data are preserved across differing system configurations.

The disclosed embodiments allow for seamless in-place updating of signatures at any point within the chain without the need for separate requests, additional functionality, or chain reconstruction; while maintaining overall chain security and integrity, and uninterrupted process flow, even under changing conditions, suitable for real-time high bandwidth and performance sensitive data applications where speed and adaptability is a requirement.

The presently disclosed embodiments also provide for the propagation of signature updates in static, ordered workflows where modifications allow the chain to be expanded and modified, resecuring the chain without having to rebuild the entire chain.

An object of the disclosed embodiments is to provide a security system and method for real-time high bandwidth systems which overcomes the shortcomings and disadvantages of the prior art.

An object of the disclosed embodiments is to provide a security system and method for real-time high bandwidth systems that is efficient and secure in that it can continuously authenticate and verify both data and the data's source in real time.

An object of the disclosed embodiments is to provide a security system and method which is compatible with real-time high bandwidth systems including, but not limited to, embedded systems, distributed systems, data pipelines, process memory operations, as well as more specific use cases such as video game anti-tampering; and is compatible with both high and low-level programming languages.

An object of the disclosed embodiments is to provide a security system and method which is highly resistant against reverse engineering, data tampering, forging, spoofing, and other types of data attacks.

An additional object is to provide a security system that operates locally and independently, supporting resource-constrained and high-performance environments.

An object is to allow seamless integration of the disclosed embodiments into existing systems without significant changes, while still maintaining real-time high bandwidth verification and adaptability to diverse requirements environments while also supporting a wide range of applications.

Other objects and advantages of the disclosed embodiments will become obvious, and it is intended that the objects and advantages are within the scope of the disclosed embodiments.

The disclosed embodiments may be implemented in the form illustrated in the accompanying drawings, attention being called to the fact, however, that the drawings are illustrative only, and that changes may be made in the specific use illustrated and described within the scope of the appended claims.

DETAILED DESCRIPTION

The disclosed embodiments provide a dynamic cascading sequence of unique signatures based on a continuously changing factor, where each signature depends on the previous one, forming a continuously evolving unique signature chain.

At each process in the chain, the disclosed system and method generates a new signature composed of the previous process's signature, one or more additional parameters, and a factor that changes at each process, and is therefor unique at each process, ensuring that each signature is always unique.

A local set of functions may generate signatures, validate signatures, and update the signatures to be implemented at every process in the chain to secure and validate, both the data source and data throughout the process flow.

The disclosed embodiments are directed to a dynamic cascading signature chain including a secure initialization step including an initial signature generation step and an initial signature validation step, referred to collectively as Process 0, and subsequent signature generation steps and signature validation steps.

Figure 1:
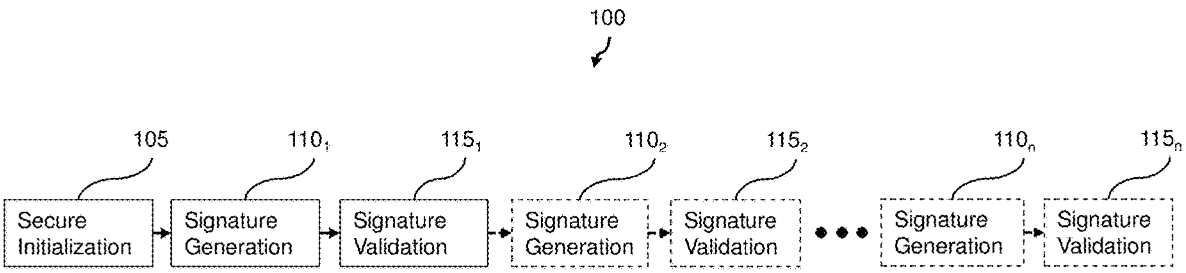
FIG. 1 depicts an example of the dynamic cascading signature chain according to the disclosed embodiments.

FIG. 1 illustrates an example of the dynamic cascading signature chain 100 according to the disclosed embodiments. The dynamic cascading signature chain 100 includes an initialization step 105, referred to as Process 0, a subsequent signature generation step $\mathbf{110}_1$ and signature validation step $\mathbf{115}_1$, referred to collectively as Process 1, optionally followed by any number of additional signature generation steps $\mathbf{110}_{2\text{-}n}$ and signature validation steps $\mathbf{115}_{2\text{-}n}$, collectively referred to as Processes 2-*n*.

While the disclosed embodiments are described in terms of including a Process 0 and a Process 1-*n*, it should be understood that Process 0 may be optional.

Figure 2:
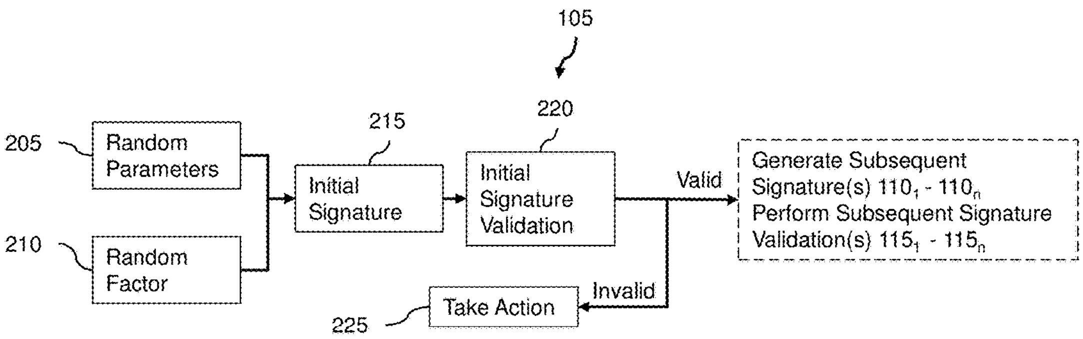
FIG. 2 depicts an example of the dynamic cascading signature chain initialization process, referred to as Process 0.

FIG. 2 illustrates an example of the dynamic cascading signature chain initialization process 105, referred to as Process 0. Process 0 may include generating random parameters 205 and generating a random factor 210. The generated random parameters and random factor may be used to generate an initial signature 215, only based on random parameters and a random factor without any data. The initial signature 215 may then be subject to initial signature validation 220. The validated initial signature may be used for subsequent signature generation steps $\mathbf{110}_1$-$\mathbf{110}_n$ and subsequent signature validation steps $\mathbf{115}_1$-$\mathbf{115}_n$.

The use of random parameters 205 and a random factor 210 in the initial signature generation 215 advantageously avoids external authentication steps and potential vulnerabilities associated with a non-secure starting point.

The initial signature generation 215 of Process 0 may be expressed as:

$$initialSig = f_{sig}(\text{random\_parameters, random\_factor})$$

where:

- $f_{sig}$ is the chosen base signature function that outputs a valid and unique signature based on one or more parameters and the factor;
- random_parameters represents unique, randomly generated parameters for Process 0; and
- random factor represents the unique, randomly generated factor for Process 0.

Signature Function

The function $f_{sig}$ for generating a signature may be selectable and may include one or more suitable cryptographic or non-cryptographic hashing algorithms.

The ability to select one or more hashing algorithms ensures that any process performance or system requirements can be met and that the present embodiments may be integrated into existing systems and maintain compatibility without introducing new dependencies or latencies.

The selected one or more signature hashing functions are utilized to generate and validate all signatures of the dynamic cascading signature chain to ensure security, compatibility, and validity.

Parameters

In Process 0, the parameters may be randomly generated, while in subsequent Processes the parameters may serve as inputs at each step, and may include context-specific quantities or values that reflect both the current state of and the source of the data being processed. These parameters are unique to each process step, and in Process 1 and subsequent processes, the parameters represent not only the data itself, but also its origin, thus establishing a link between data integrity and source authenticity throughout the system.

By incorporating process-specific parameters, the instant system and method provide and enable real-time, step-by-step verification that adapts to each unique context, applicable to a broad set of use cases. This configuration ensures that data integrity is always tied to the data's source, creating a continuously validated signature chain that is resistant to reverse-engineering, tampering, replay attacks, and other security threats.

Random Factor

The factor is a component of the signature, and in Process 0, the factor may be randomly generated and is therefor unique, making prediction or replication infeasible even if the data being secured itself is redundant and/or identical. This ensures that the initial and constantly generated dynamic signatures cannot be reused, and that each signature is distinct, contributing to the dynamic nature of the signature chain and providing a foundational resistance to reverse-engineering, tampering, and other potential data security attacks. This instant system and method "flow" of constantly changing values allows for a streaming verification of signatures thus avoiding the necessity for any centralized, stored, or shared point of trust, common to many known authentication and verification methods that depend on blockchain, signatures, keys, certificates, tokens, or shared or static secrets.

Additionally, the inherent uniqueness of the instant signature chain provided by the uniquely generated factor allows the instant system and method to avoid reliance on complex cryptographic functions, unless desired, thus supporting fast, non-cryptographic hashing algorithms, without compromising security; useful for meeting limited-resource, low-latency, or high performance requirements typical of high bandwidth data systems and resource constrained environments, such as low level software processes, embedded systems, data pipelines, distributed architectures, and concurrent event driven architectures, in all of which the disclosed embodiments may be applicable.

Encryption may not be necessary because the security of the disclosed embodiments lies in the constantly changing random values, where there is no need to encode or conceal data unless desired, because the data verification is constantly changing and validated in real time.

At each system process step, a factor may be newly generated with every new signature, ensuring that the resulting signatures will always differ, even if input parameters, data, or both remain the same across steps, preventing signature reuse, guessing, or tampering. Uniquely generated factors may be generated by any suitable generation function as long as the generated factor is always unique and unpredictable, and always being newly generated at each step in a system process to maintain uniqueness and security of the dynamic cascading signature chain.

The generated initial signature 215 is verified by an initial signature validation function 220 that generates a signature using the signature generation function $f_{sig}$ used to generate the initial signature 215 and the random parameters 205 and random factor 210. The resulting signature is then compared to the initial signature 215 and returns a Boolean value of True if the signatures match, or False to indicate the signatures do not match. If the signatures do not match, the dynamic cascading signature chain 100 may be programmed to take any number of appropriate actions 225, for example, halting operation of a system in which the chain 100 is operating, logging the mismatch, sending an alert, updating the signature, as described below, or any other suitable actions or combination of actions.

If the signatures match, and a Boolean value of True is returned, the chain 100 may proceed to Process 1.

The initial signature validation process 220 may be expressed as:

$$\text{Verified} = f_{verify}(f_{sig}(\text{random\_parameters}, \text{random\_factor}))$$

where:

$f_{verify}$ is a verification function that executes $f_{sig}$ using the random parameters and randon factor and compares the resulting signature with the initial signature 215 InitialSig above, and returns a Boolean value of True if the signatures match, or False if the signatures do not match; and Verified is the Boolean result of the signature comparison.

Process 0 should optionally be executed at system startup, before any other actions thus providing added security as this "initial load process step" serves as a randomized base establishing a secure starting point for generating all subsequent dynamic chain signatures.

Figure 3:
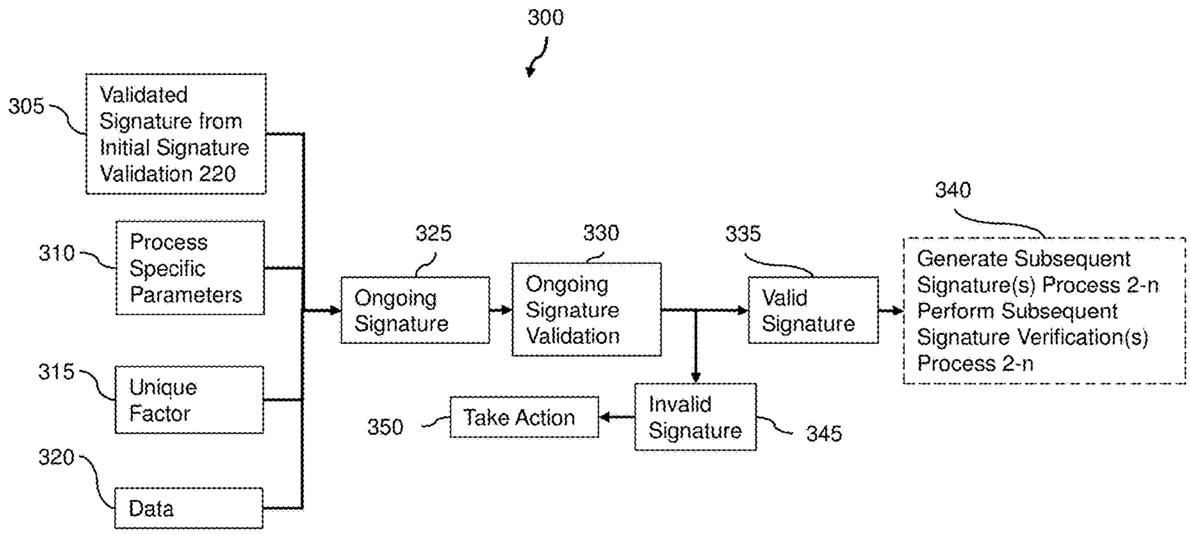
FIG. 3 depicts an example of a subsequent signature generation process of the dynamic cascading signature chain, referred to as Process 1.
Figure 4:
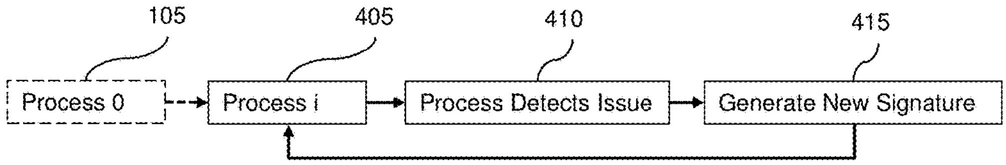
FIG. 4 illustrates an in-place update procedure according to the disclosed embodiments.

FIG. 3 illustrates an example of a subsequent signature generation process 300 of the dynamic cascading signature chain 100, referred to as Process 1.

Process 1 generates an on going signature 325 using the validated initial signature 305 from Process 0, process specific parameters 310, a factor 315 unique to the process, and data 320 to be stored in the ongoing signature 325. The ongoing signature 325 may then be subject to validation 330. The validated ongoing signature 335 may be used for subsequent Processes 2-*n* with signature generation and signature validation steps 340.

This process repeats throughout the dynamic cascading signature chain ensuring that each process builds on the prior process with constantly changing signatures that reflect unique factors at each process.

The ongoing signature generation 325 of Process 1 and subsequent processes, collectively referred to as Process i, may be expressed as:

$$Sig_i = f_{sig}(Sig_{i-1}, \text{parameters}_{i \ldots n}, \text{unique\_factor}_i, \text{data}_i)$$

where:

$Sig_i$ is the resulting signature generated for Process i $f_{sig}$ is the chosen base signature function described above that outputs a valid and unique signature based on one or more parameters and a unique $factor_i$, $Sig_{i-1}$ is the signature from the previous Process (i–1), which may also include Process 0, parameters 1 . . . n are one or more parameters for the current Process, unique $factor_i$ is the newly generated dynamic factor at Process i, and $data_i$ is the data to be stored in $Sig_i$

Parameters

One or more parameters are required and should be reflective of the current Process. These parameters could include values such as process identifiers, transaction data, system state, and/or any other information relevant to the data and the source of the data at that particular Process i. In Process 1 and subsequent processes the parameters $_{1\ n}$ represent not only the data itself, but also its source. A parameter may represent the data by an identifier or description of the data, a characteristic of the data, meta data of the data, or any other suitable method of representing the data. A parameter may represent the source by representing a previous process, an identifier, description, or meta data of a previous process, a characteristic of a previous process, an identifier or meta data of a mechanism from which the data was originally created or obtained, meta data, or any other suitable identification of the source of the data.

Unique Factor

The factor for Process 1 and subsequent processes is a component of the signature generated at each process which changes at each process, and is therefor unique at each process ensuring that the signatures generated therewith are unique at each process, making prediction or replication infeasible even if the data being secured itself is redundant and/or identical. In some embodiments, the factor for Process 1 and subsequent processes may be randomly generated.

The ongoing signature validation 330 of Process 1 may be expressed as:

$$\text{Verified} = f_{verify}(f_{sig}(\text{proces\_specific\_parameters, unique\_factor, data}))$$

where:

$f_{verify}$ is a verification function that executes $f_{sig}$ using the process specific parameters 310, unique factor 315 and data 320 and compares the resulting signature with the ongoing signature 325, and returns a Boolean value of True if the signatures match, resulting in a valid signature 335, or False if the signatures do not match, resulting in an invalid signature 345, resulting in appropriate action 350 for example, halting operation of a system in which the chain 100 is operating, logging the mismatch, sending an alert, updating the signature; and wherein Verified is the Boolean result of the signature comparison.

For each subsequent Process, let i represent the current Process, where i>0, and where the dynamic cascading signature chain generates a new signature composed of the previous signature, the current Process's parameters, and a dynamically generated factor, ensuring that even repeated parameters produce unique signatures.

Process 1 generates its ongoing signature 325 based on the signature from Process 0, 305, Process 1's specific parameters 310, a dynamically generated unique factor 315, and data 320 to be stored in Process 1's ongoing signature 325. If additional Processes are present in the dynamic cascading signature chain, for example, Processes 2-4, Process 1's validated signature, along with the parameters and factor, are passed to Process 2. Process 2 generates its signature using the signature from Process 1, specific parameters for Process 2, a new dynamically generated factor. This pattern continues through Process 3 and Process 4, with each process generating its own signature based on the previous process's signature, its own specific parameters, and a newly generated dynamic factor, thereby forming a dynamic, cascading signature chain.

This chaining process ensures that each signature builds upon the previous one, forming a real-time, high bandwidth, dynamically evolving chain of signatures that adapts as the workflow progresses using each processes specific parameters and newly generated factor at each step.

Thus, a method for securing data in real-time high bandwidth streaming systems includes initializing a security process with an initial signature derived from random parameters and a random factor, generating, for each subsequent step, a unique signature based on the previous signature, one or more verifiable parameters, and a newly generated dynamic factor, and validating each generated signature against the signature from the previous process step to ensure data integrity and source authenticity.

In-Place Signature Updates

In response to an error, tampering, or parameter updates, the disclosed embodiments may further include a signature update function that allows for both in-place, localized updates of signatures, and the forward propagation of signature updates if needed, without requiring new processes or rebuilding of the chain.

As an option and an extra security measure it may be desirable to re-implement Process 0 before generating an updated signature to create a fresh randomized base signature with which to continue forward in further Processes.

An updated signature may be generated in the same way as a typical signature generation Process $_{1\ \ldots\ n}$ using the previous valid signature, one or more parameters, and a newly generated factor expressed as:

$$Sig_i = f_{sig}(Sig_{i-1}, \text{parameters, new\_factor})$$

where:

i is the current updated step.

This method allows for immediate regeneration and ensures that the workflow can continue forward without delays, overhead, or bottlenecks.

In some embodiments, it may be desirable to update signatures across a sequence of processes, for example, systems in a data pipeline, devices in IoT pipeline, or any situation in which processes of systems are strictly connected in a sequence.

Update propagation is achieved through a sequential loop starting from i, the currently updated step, where each step forward updates its signature based on the previous, in the same way as typical signature generation, expressed as:

for i=current update+1 to end: $\text{Sig}_i = f_{sig}(\text{Sig}_{i-1}$, parameters, new_salt)

Update propagation may and can be useful in sequential applications such as in a stream of components or a pipeline of systems where a signature is generated at each component or each system, allowing a physical sequence to be secured.

The disclosed embodiments provide the ability to perform streaming updates from within an independent process, allowing for low latency, real-time adaptability functionality, while preserving consistency, and integrity throughout the workflow, regardless of system complexity.

Use Cases

FIG. 5-11 illustrate use cases in which the disclosed embodiments may be applied.

Figure 5:
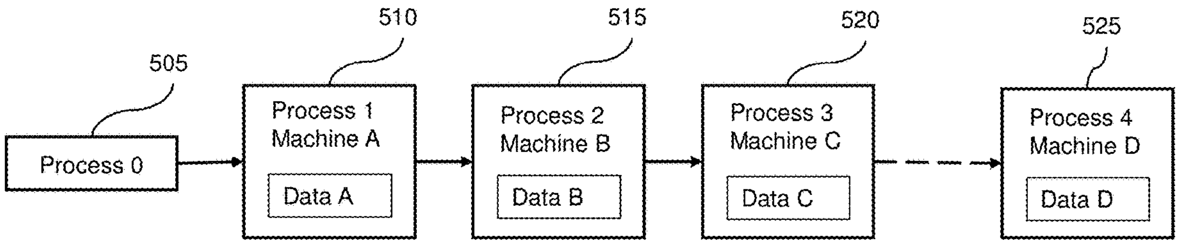
FIG. 5 illustrates an example of the dynamic cascading signature chain as applied to a bank of machines as part of a secure sequential process.

FIG. 5 illustrates an example of the dynamic cascading signature chain as applied to a bank of machines as part of a secure sequential process 505, 510, 515, 520, 525 for example, a secure sequential computing or manufacturing process. The parameters, factors, and signatures as applied to the data of each process allow the instant system and method to continuously verify both the authenticity of the data and the integrity of its origin. In this context, each signature uniquely reflects the current data and securely links each machine's data to the machine itself through the machine's parameters, allowing for immediate tamper-detection and resistance to reverse engineering attempts that may try to manipulate the data as it flows through the processes.

Figure 6:
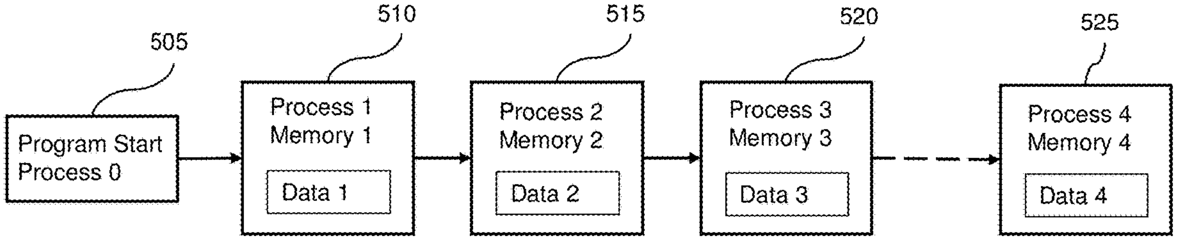
FIG. 6 depicts an example of the disclosed embodiments as applied to a process memory application

FIG. 6 illustrates an example of the dynamic cascading signature chain as applied to processes 605, 610, 615, 620, 625 applied to sequentially addressed memory locations within a memory system. The parameters, factors, and signatures as applied to the data of each memory location allow the memory system to continuously verify both the authenticity of the data in each location and the integrity of its origin. Each signature in the memory system reflects the data in the associated location and links the data to the location through the signature's parameters, allowing for immediate tamper-detection and resistance to reverse engineering attempts. In this embodiment, the parameters may include the memory address, pointer data, data length, or other process-specific identifiers.

These parameters allow the instant system and method to continuously verify both the authenticity of the data and the integrity of its origin. In this context, each signature uniquely reflects the current memory state, securely linking each step's data to the data's source allowing for immediate tamper-detection and resistance to reverse engineering attempts that may try to manipulate data as it flows through a program.

Figure 7:
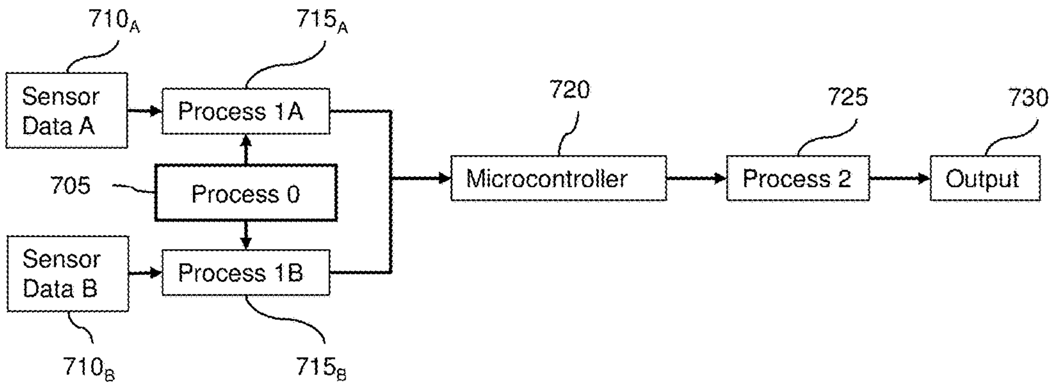
FIG. 7 depicts an example of the disclosed embodiments as applied to an embedded application

FIG. 7 illustrates an example of the dynamic cascading signature chain as applied to an embedded system with sensors 710*a*, 710*b*, and a microcontroller 720 producing an output 730. The dynamic cascading signature chain provides process 705 as Process 0, and Processes 1A, $\mathbf{715}_a$, and 1B, $\mathbf{715}_b$, as applied to the outputs of sensors $\mathbf{710}_a$ and $\mathbf{710}_b$, respectively, and Process 2, 725 applied to the output of the microcontroller 720. The parameters, factors, and signatures as applied to the outputs of the sensors $\mathbf{710}_a$, $\mathbf{710}_b$ and the microcontroller 720 provides the embedded system with the ability to verify both the authenticity and origin of the sensor outputs, along with the authenticity and origin of the microcontroller output. In this embodiment, the sensor parameters may include sensor identification information and sensor output characteristics, while the microcontroller parameters may include a word length clock speed or any other suitable parameters.

Figure 8:
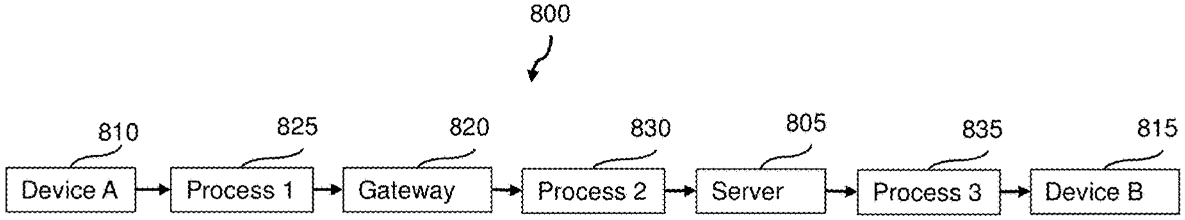
FIG. 8 depicts an example of the disclosed embodiments as applied to an Internet of Things network application

FIG. 8 shows an example of the dynamic cascading signature chain as applied to an Internet of Things system 800, where this embodiment includes a server 805, a device A 810 and a device B 815, and a gateway 820 between the devises 810, 815. This dynamic cascading signature chain provides Process 1, 825 between device A, 810 and gateway 820, process 2, 830, between gateway 820 and server 805, and process 3, 835, between server 805 and device B, 815. The parameters, factors, and signatures as applied to the components of the system 800 provides the Internet of Things system with the ability to verify both the authenticity and origin of the data passed from one component to the next.

Figure 9:
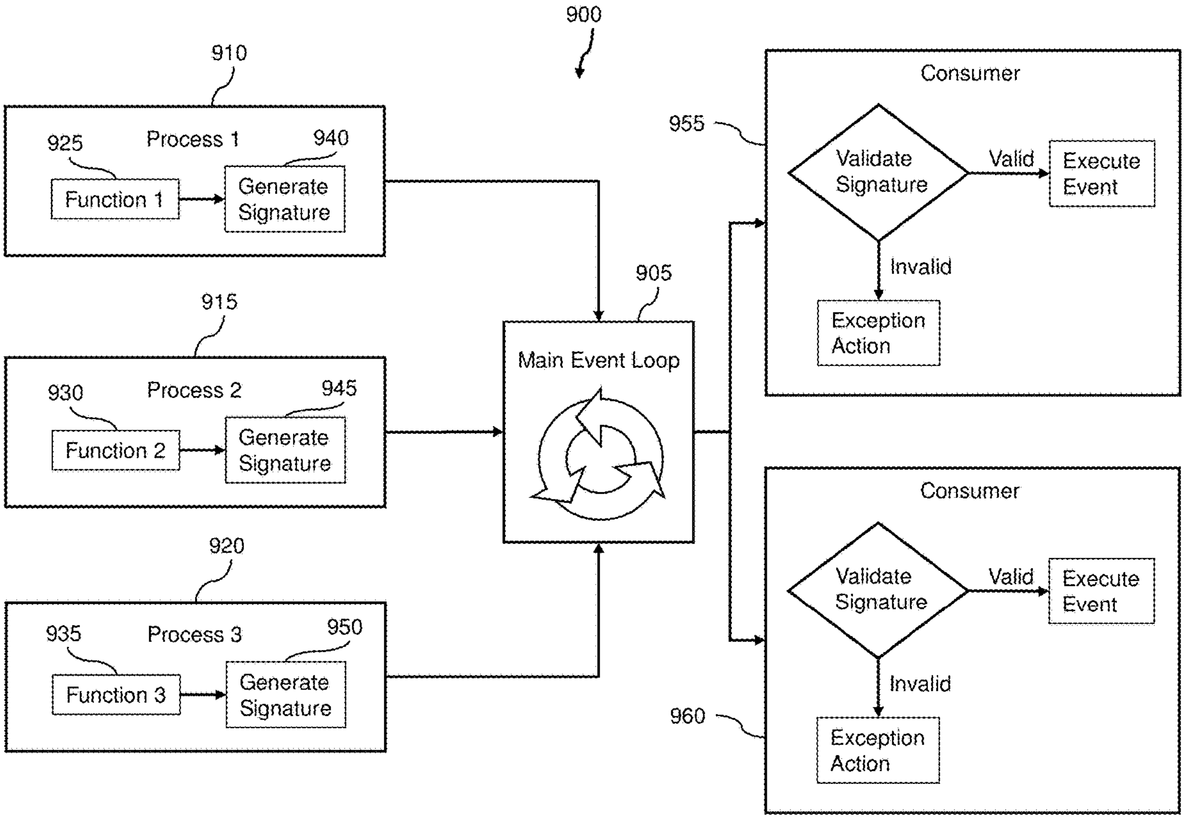
FIG. 9 depicts an example of the disclosed embodiments as applied to event driven architecture

FIG. 9 illustrates the disclosed embodiments as implemented in an event driven software architecture 900, such as a game, in order to prevent cheat engines from manipulating in-game elements, using a main event loop function 905 which serves as the core of the game engine in which events are processed. In this loop, the instant system and method validation method may be applied to verify events as they are processed, such as character movement, or point calculations. The game may include processes Process 1, 910, Process 2, 915, and Process 3, 920, with functions Function 1, 925, Function 2, 930, and Function 3, 935, respectively in which each function implements the disclosed embodiments, generating signatures 940, 945, 950 for each game event as they occur. These signatures are then passed through the event loop 905 and are then verified in verification blocks 955, 960.

If a cheat engine were to "hook into" any of these functions in order to manipulate a particular property or functionality, such as attempting to add points, the game engine can immediately detect this manipulation and act accordingly via the instant system and method, such as exiting the game or performing an in-place signature update and ignoring the manipulation action, thereby thwarting reverse-engineering and tampering attempts within the game, this method can also be carried through to the network in the case of multiplayer games where these values are eventually pushed to the network for synchronization in which users may also tamper with the network packets before they reach the server.

This level of protection is achieved because the signatures are constantly changing at each generation, through the dynamic factor, in real time, adding significant challenges in static or dynamic reverse engineering attempts, due to both the speed and randomness of the instant system and method functions. This speed is possible because the instant system and method is completely localized and can be optimized at a very low level thus able to operate at real time speeds, which is not possible for other known systems and methods which rely on external dependencies, cryptography, and other traditional methods. In the case of an event-driven architecture such as in a game, optimal speed and uninterrupted performance in which events are processed is a requirement.

Figure 10:
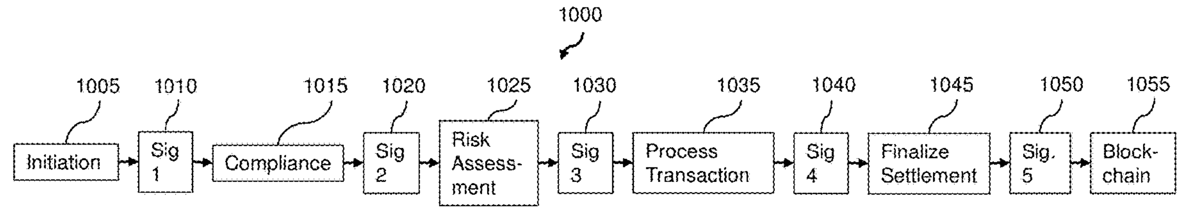
FIGS. 10-12 depicts examples of the disclosed embodiments as applied to financial systems 1000, healthcare systems 1100, and supply chain systems, as secure input to a blockchain.
Figure 11:
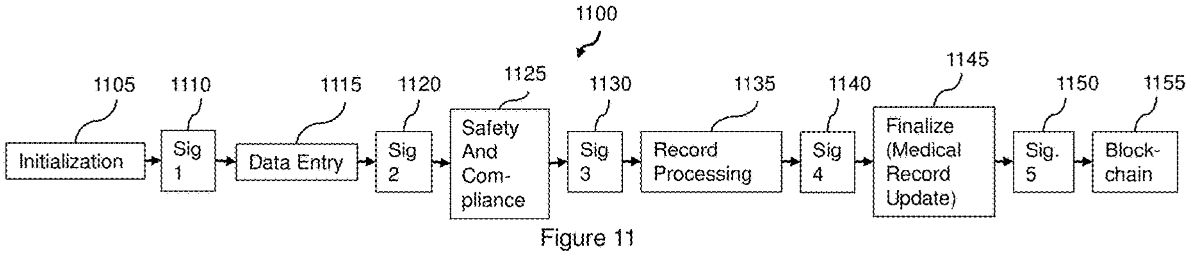
Figure 12:
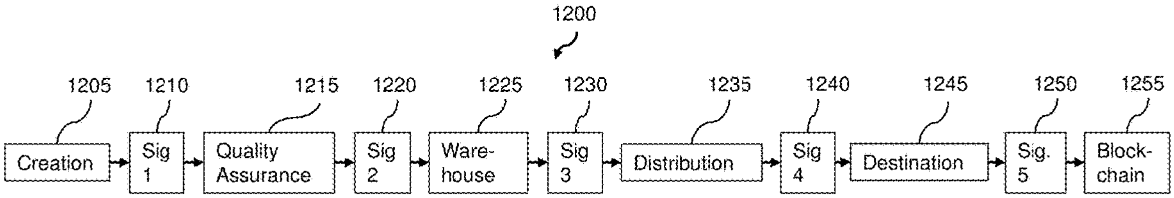

FIGS. 10-12 depict the disclosed embodiments as applied to streaming systems that provide an input to a blockchain, in particular to financial systems 1000, healthcare systems 1100, and supply chain systems, as secure input to a blockchain.

As shown in FIG. 10, an exemplary financial system 1000 includes an initiation step 1005, a first signature step 1010, a compliance step 1015, a second signature step 1020, a risk assessment step 1025, a third signature step 1030, a process transaction step 1035, a fourth signature step 1040, a finalize settlement step 1045, and a fifth signature step 1050, as input to the block chain 1055.

Referring to FIG. 11, an exemplary healthcare system 1100 includes an initialization step 1105, a first signature step 1110, a data entry step 1115, a second signature step 1120, a safety and compliance step 1125, a third signature step 1130, a record processing step 1135, a fourth signature step 1140, a finalize step 1145, and a fifth signature step 1150, as input to the block chain 1155.

Referring to FIG. 12, an exemplary supply chain system 1200 includes a creation step 1205, a first signature step 1210, a quality assurance step 1215, a second signature step 1220, a warehouse step 1225, a third signature step 1230, a distribution step 1235, a fourth signature step 1240, a destination step 1245, and a fifth signature step 1250, as input to the block chain 1255.

Figure 13:
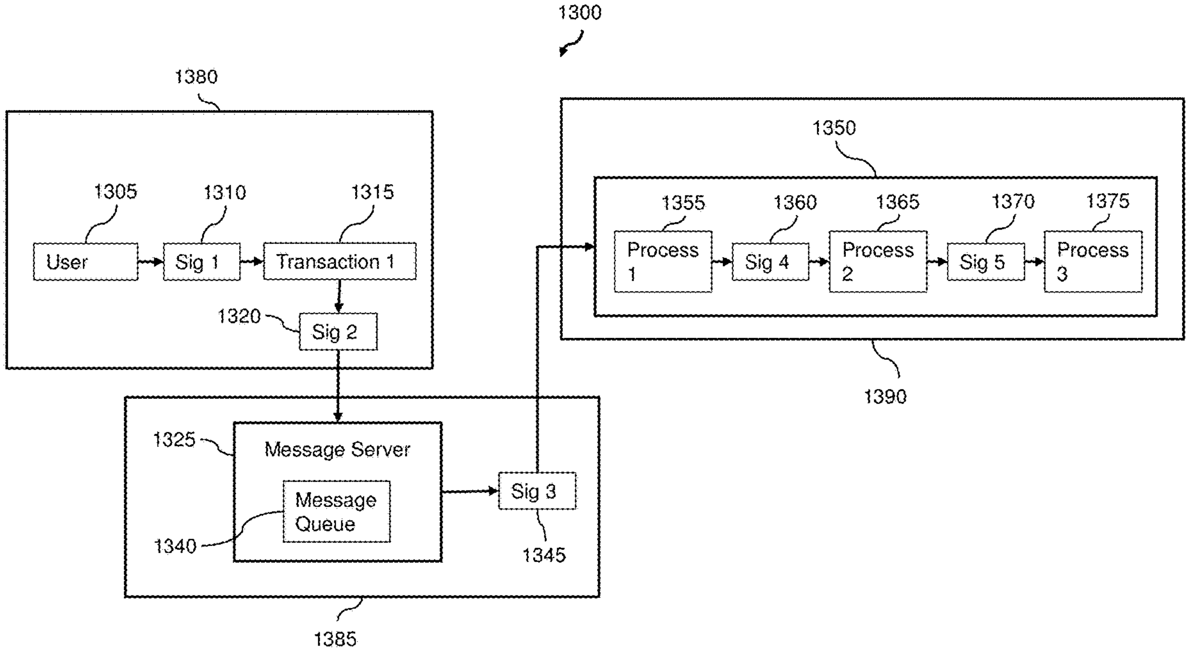
FIG. 13 shows an example of the disclosed embodiments as applied to a hybrid distributed architecture.

FIG. 13 shows an example of the disclosed embodiments as applied to a hybrid distributed architecture, including, for example, a transaction based system 1380, an asynchronous communication system 1385, and a sequential computing or manufacturing system 1390. In the embodiment of FIG. 13, a user 1305 may use data to generate a first signature 1310 which in turn may be used in a transaction 1315. The output of the transaction may be used in a second signature 1320 having an output which is a message passed to a queue 1340 in an asynchronous communication system 1385, for example, a message server 1325. An output of the message server 1325 may be used in a third signature 1345 which in turn may be used in a sequential computing or manufacturing system 1390, including for example, sequential process 1350 with a first process 1355, a fourth signature 1360, a second process 1365, a fifth signature 1370, and a third process 1375.

Figure 14:
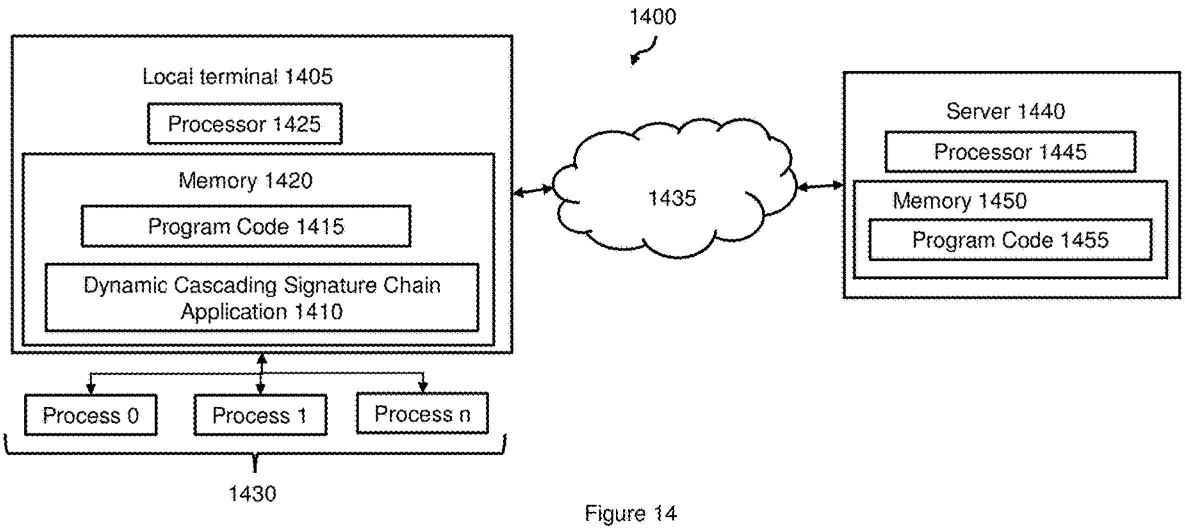
FIG. 14 shows a schematic illustration of a general system applicable to the disclosed embodiments.

FIG. 14 shows a schematic illustration of a general system applicable to the disclosed embodiments in which a dynamic cascading signature chain may be implemented. The system may a local terminal 1405 operating an application 1410 that implements the dynamic cascading signature chain.

The local terminal 1405 may include computer readable program code 1415 stored on at least one non-transitory computer readable medium for carrying out and executing the dynamic cascading signature chain. The computer readable medium may be a memory 1420 and the local terminal 1405 may also include a processor 1425 for executing the computer readable program code 1415. The local terminal 1405 may also control the execution of the dynamic cascading signature chain in one or more processes 1430, as described herein.

In some embodiments, the dynamic cascading signature chain may be delivered through a network 1435 by a server 1435, having a processor 1445, and memory 1450 storing computer program code 1455 for generally delivering the dynamic cascading signature chain to the local terminal.

Thus, a method for securing data in real-time high bandwidth streaming systems, is disclosed, the method including initializing a security process with an initial signature derived from random parameters and a random factor, generating, for each subsequent step, a unique signature based on the previous signature, one or more verifiable parameters, and a newly generated dynamic factor, and validating each generated signature against the signature from the previous process step to ensure data integrity and source authenticity.

The method may further include updating signatures in-place upon detection of an anomaly.

The verifiable parameters may include at least one of process identifiers, transaction data, or system state.

The initial signature may ensure no external authentication steps are required at the start.

The dynamic signature chain may support both high and low-level language implementations.

Also disclosed is a system for continuous authentication in real-time data systems, the system having a signature generation module configured to create a dynamic signature for each process step using a previous signature, current step parameters, and a unique dynamic factor, a signature validation module to compare each generated signature with a recomputed signature from the same data and parameters, and an initialization module to start the signature chain with a randomly generated initial signature.

The signature generation module may use a non-cryptographic hashing function for efficiency.

The system may further include a module for updating signatures when discrepancies are detected.

Each module may be designed to work independently, reducing dependencies.

The system may not rely on static secrets, thus reducing vulnerability to reverse engineering.

The disclosed embodiments additionally include a computer-implemented method for providing security in data pipelines, including creating a cascading signature chain where each signature is a function of the previous signature, specific data parameters, and a dynamically generated factor, and verifying each signature in real-time to ensure data has not been tampered with or altered.

The dynamic factor may be generated using a random number generator at each step.

The signature generation may use the xxHash algorithm to balance speed and security.

The dynamic factor may be generated in such a way that it cannot be predicted or duplicated.

Signature validation may be performed without external dependencies, enhancing system autonomy.

An apparatus for securing data in distributed systems may include means for generating a unique signature at each step of a data process using previously generated signatures, process-specific parameters, and a dynamic factor, and means for validating these signatures in real-time to detect any unauthorized modifications.

The means for validation may operate to compare signatures using a base function identical across all steps.

The means for generating signatures may be implemented in low-level programming languages for efficiency.

Signature validation may be performed in real-time without significant delay.

The apparatus may be designed to operate under varying bandwidth conditions without performance degradation.

The disclosed embodiments may be directed to a security method for embedded systems including generating a series of signatures where each signature is dependent on the last, incorporating system-specific parameters and a new factor each time, and performing in-place updates of signatures to respond to detected tampering without halting system operations.

The security method for embedded systems may include reinitializing with a new initial signature upon detecting a security breach.

The signatures may be validated against power consumption or timing patterns to counter side-channel attacks.

The security method may adapt to changes in data flow without compromising security.

The security method may detect and respond to tampering attempts in real-time without system downtime.

The embodiments further include a software architecture for real-time event-driven systems, having an event loop where each event triggers the generation of a new signature, and a signature chain where each signature integrates the previous event's signature, event data, and a new factor for continuous verification.

The event loop may apply the signature validation method to each event to ensure game integrity.

The architecture may be designed for use in video games to prevent manipulation by cheat engines.

Signatures in the architecture may be used to authenticate user actions in real-time multiplayer games.

Signatures in the architecture may be part of an event-driven security paradigm to ensure each event's authenticity.

The disclosed embodiments encompass a method for improving security in high-performance computing environments using a non-cryptographic hashing algorithm for signature generation to maintain speed while ensuring security through dynamic factors.

The hashing algorithm may be optimized for speed to match the demands of high bandwidth systems.

The method for improving security may be applicable in resource-constrained environments like IoT devices or industrial sensors.

The choice of hashing algorithm may be adapted based on the security-performance trade-off required by an associated application.

The method may support quick recovery mechanisms through signature regeneration.

Other embodiments include a system for securing data in sequential workflows, including a module for generating signatures that propagate through a sequence of steps, each signature incorporating the signature of the previous step, current step parameters, and a new factor.

Signature updates may be propagated through subsequent steps without reconstructing the entire chain.

The system for securing data in sequential workflows may ensure that even repeated data results in unique signatures due to dynamic factor usage.

The signature chain can be seamlessly integrated into existing workflow systems.

The signature chain of the system for securing data in sequential workflows may be expanded or modified without rebuilding from scratch.

The embodiments disclosed herein also include a data security method for low-level operations that includes generating signatures for memory operations or inter-process communications using a dynamic signature chain to ensure data integrity.

The signatures may be used to verify the integrity of data in process memory or during data transitions between processes.

The signatures may be used to secure data in embedded systems where physical security is a concern.

The signatures may be used to detect unauthorized modifications in memory or during system calls.

The signatures may provide a traceable security layer for all data interactions within the low-level operations.

The disclosed embodiments may include a method for thwarting data attacks in networked applications, including implementing dynamic signatures for each data packet or transaction, where each signature uses the previous signature, packet-specific data, and a new factor to prevent replay and side-channel attacks.

The signatures may be validated at both sending and receiving nodes to prevent network tampering.

The signatures may be part of a larger security framework including encryption for additional layers of protection.

The method may use signatures to maintain data integrity across distributed nodes and provide less complexity compared to traditional security methods like blockchain, while maintaining high security in real-time environments.

There has thus been outlined, rather broadly, the features of the disclosed embodiments in order that the detailed description thereof may be better understood, and in order that the present contribution to the art may be better appreciated. There are additional features of the disclosed embodiments that will be described hereinafter and that will form the subject matter of the claims appended hereto.

It is to be understood that the embodiments are not limited in their application to the details of construction and to the arrangement of the components set forth in the following description or illustrated in the drawings. The disclosed embodiments are capable of other embodiments and of being practiced and carried out in various ways. Also, it is to be understood that the phraseology and terminology employed herein are for the purpose of the description and should not be regarded as limiting.

This disclosure is not to be limited by the embodiments as described, since these are given by way of example only and not by way of limitation.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

Having thus described several embodiments for practicing the disclosed method, its advantages and objectives can be easily understood. Variations from the description above may and can be made by one skilled in the art without departing from the scope of the invention, which is to be determined from and by the following claims.

The invention claimed is:

1. A method of providing a dynamic cascading signature chain for at least one process in a streaming system, comprising using a local terminal for:
- generating an initial signature by:
  - generating random parameters;
  - generating a random factor; and
  - applying a hashing function to the random parameters and the random factor;
- validating the initial signature by:
  - applying the hashing function to the random parameters and the random factor;
  - comparing the resulting signature to the initial signature and when the resulting signature and the initial signature match;
- generating at least one ongoing signature by:
  - generating parameters specific to the at least one process;
  - generating a unique factor; and
  - applying the hashing function to the validated initial signature, the process specific parameters, the unique factor and data associated with the at least one process; and
- validating the at least one ongoing signature.

2. The method of claim 1, comprising validating the at least one ongoing signature by:
- applying the hashing function to the parameters specific to the at least one process, the unique factor and the data associated with the at least one process; and
- comparing the resulting signature to the ongoing signature.

3. The method of claim 1, comprising generating one or more updated signatures from one or sequential previous valid ongoing signatures, one or more parameters for each sequential previous valid ongoing signature and a newly generated factor for each sequential previous valid ongoing signature.

4. The method of claim 3, wherein when the resulting signature and the initial signature do not match, the dynamic cascading signature chain is operable to at least halt operation of the streaming system, log the mismatch, send an alert, or generate one or more updated signatures.

5. The method of claim 1, wherein the streaming system comprises a sequential computing or manufacturing system.

6. The method of claim 1, wherein the streaming system comprises sequentially addressed memory locations within a memory system.

7. The method of claim 1, wherein the streaming system comprises an embedded system.

8. The method of claim 1, wherein the streaming system comprises an Internet of Things system.

9. The method of claim 1, wherein the streaming system comprises an event driven software architecture.

10. The method of claim 1, wherein the streaming system comprises an input to a blockchain event driven software architecture.

11. The method of claim 1, wherein the streaming system comprises a hybrid system with a transaction system, an asynchronous communication system, and a sequential computing or manufacturing system.

12. A system operable to implement a dynamic cascading signature chain for at least one process in a streaming system, comprising:

a local terminal including a processor executing computer readable program code to:

generate an initial signature by:

generating random parameters;

generating a random factor; and applying a hashing function to the random parameters and the random factor;

validate the initial signature by:

applying the hashing function to the random parameters and the random factor;

comparing the resulting signature to the initial signature and when the resulting signature and the initial signature match;

generate at least one ongoing signature by:

generating parameters specific to the at least one process;

generating a unique factor; and applying the hashing function to the validated initial signature, the process specific parameters, the unique factor and data associated with the at least one process; and validate the at least one ongoing signature.

13. The system of claim 12, wherein the processor is further operable to execute the computer readable program code to generate one or more updated signatures from one or sequential previous valid ongoing signatures, one or more parameters for each sequential previous valid ongoing signature and a newly generated factor for each sequential previous valid ongoing signature.

14. The system of claim 12, wherein when the resulting signature and the initial signature do not match, the processor is operable to control the dynamic cascading signature chain to at least halt operation of the streaming system, log the mismatch, send an alert, or generate one or more updated signatures.

15. The system of claim 12, wherein the streaming system comprises a sequential computing or manufacturing system.

16. The system of claim 12, wherein the streaming system comprises sequentially addressed memory locations within a memory system.

17. The system of claim 12, wherein the streaming system comprises an embedded system.

18. The system of claim 12, wherein the streaming system comprises an Internet of Things system.

19. The system of claim 12, wherein the streaming system comprises an event driven software architecture.

20. The system of claim 12, wherein the streaming system comprises an input to a blockchain.

* * * * *